United States Patent [19]

Wheeler

[11] 4,080,627
[45] Mar. 21, 1978

[54] APERTURE CORRECTION CIRCUITRY FOR A VIDEO CORRECTION SYSTEM

[75] Inventor: Robert C. Wheeler, Elba, N.Y.

[73] Assignee: GTE Sylvania Incorporated, Stamford, Conn.

[21] Appl. No.: 760,283

[22] Filed: Jan. 19, 1977

[51] Int. Cl.² .................. H04N 5/14; H04N 5/14
[52] U.S. Cl. ........................ 358/162; 358/169
[58] Field of Search ............ 358/37, 162, 169; 307/262

[56] References Cited

U.S. PATENT DOCUMENTS

| | | | |
|---|---|---|---|
| 3,549,901 | 12/1970 | Ross et al. | 358/37 X |
| 3,849,792 | 11/1974 | Holzrichter | 358/37 |
| 4,030,121 | 6/1977 | Faroudja | 358/37 |

Primary Examiner—Robert L. Griffin
Assistant Examiner—Aristotelis M. Psitos

Attorney, Agent, or Firm—Norman J. O'Malley; Thomas H. Buffton; Robert E. Walrath

[57] ABSTRACT

A video processing system for a television receiver is shown. The video processing system includes a gain controlled stage through which a video signal is coupled. The gain of the stage is controlled to provide contrast control of the video signal. The video signal is also applied to an aperture correction circuit which develops an aperture correction signal including pre-shoot and over-shoot transient responses. The aperture correction signal is also coupled through the gain controlled stage so that it is amplified or attenuated by the same amount as the video signal. The output of the gain controlled stage is coupled to an output stage where the black level of the video signal is controlled by a black level control circuit. The disclosed video processing system is further adapted for fabrication in integrated circuit form.

10 Claims, 4 Drawing Figures

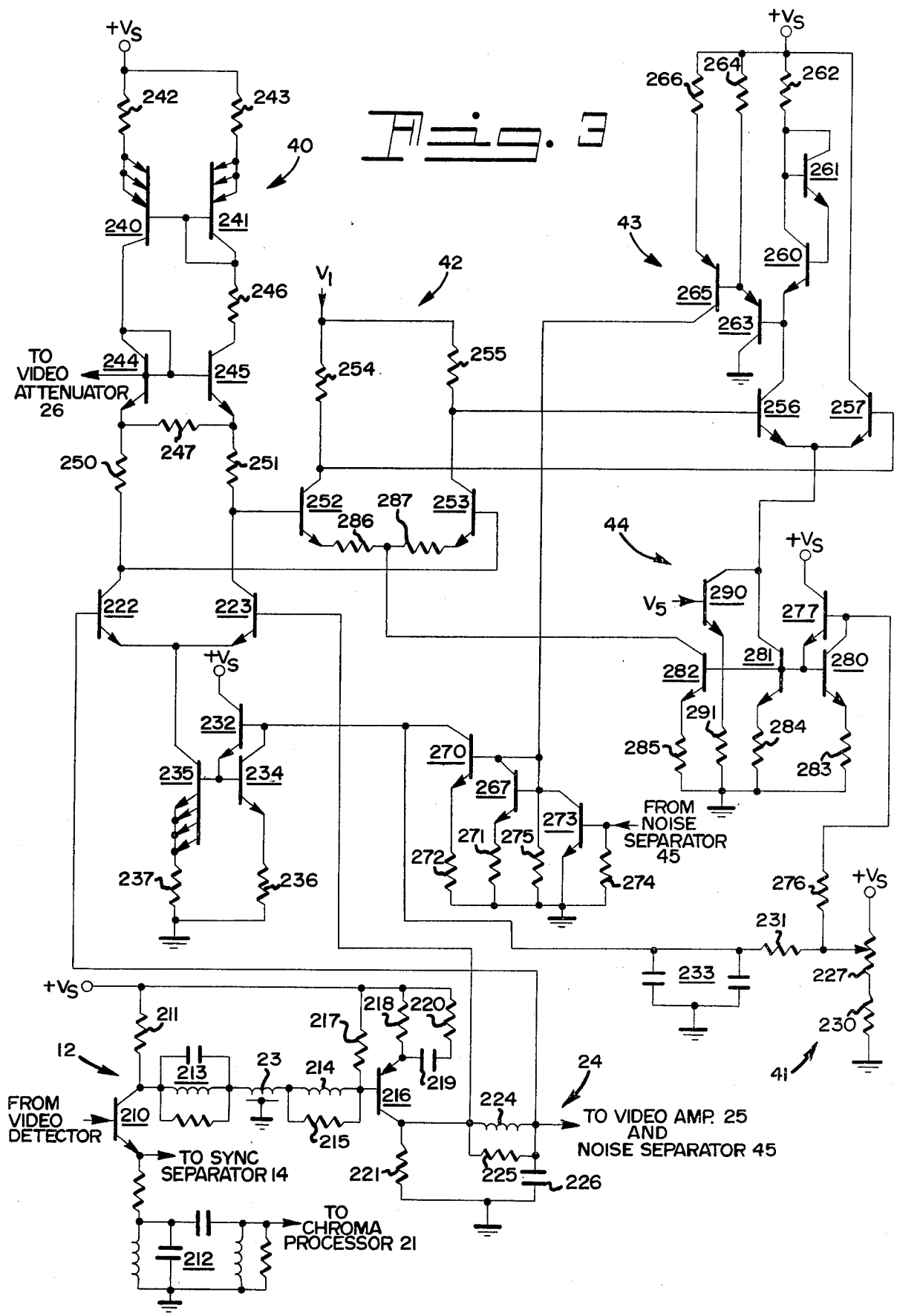

APERTURE CORRECTION CIRCUITRY FOR A VIDEO CORRECTION SYSTEM

CROSS-REFERENCE TO RELATED APPLICATIONS

K. J. Burdick et al., "Automatic Peaking Control Circuitry For A video Processing System," Ser. No. 760,366; R. C. Wheeler, "Video Processing System," Ser. No. 760,284; A. H. Klein, "Blanking Circuitry For A Television Receiver Video System, " Ser. No. 760,364; R. C. Wheeler, "Contrast Control Circuitry For A Video Processing System," Ser. No. 760,361; all filed the same date and assigned to the same assignee as this application. G. K. Srivastava and R. C. Wheeler, "Adjustable Aperture Correction System," U.S. Pat. No. 4,021,848, and assigned to the same assignee as this application.

FIELD OF THE INVENTION

This invention relates to aperture correction circuitry for a video processing system for television receivers and more particularly to aperture correction circuitry for generating an aperture correction signal for addition to the video signal in a video processing system.

BACKGROUND OF THE INVENTION

Composite video signals of the type used in television systems include video and synchronizing information. The video information is divided into sequential trace and retrace signals with the synchronizing information transmitted as pulses during the retrace portion of the video information. During the trace interval, the video signal varies between black and white levels. The retrace interval video signal includes a blanking portion which is at or slightly greater than black level so that the electron beam in the cathode ray tube (CRT) is turned off during retrace. If all of the levels of the various components of the video signal are properly adjusted at the studio and properly transmitted and received, the video signals can be properly displaced on a CRT screen. Unfortunately, adjustment errors and transmitting and receiving errors require processing and correction of the video signal to achieve a satisfactorily displayed image.

A form of video signal error which commonly occurs is degradation of the sharpness of the image. Numerous variations in picture sharpness and numerous causes for such variations are encountered in typical TV transmissions. Such variations can be caused, for example, by differing video signal transient characteristics of the various video signal sources used in the TV studio. Also, the video distribution systems used in the studio may have different video frequency response and group delay characteristics. Transmitters and modulators at different studios or stations also have different video frequency response and group delay characteristics. Multipath or ghost pick-up conditions at the receiving antenna can greatly vary detected video signal transient response due to signals being cancelled at some frequencies and reinforced at others. Additionally, the TV receiver radio frequency intermediate frequency, and video responses may vary from channel to channel. Factors other than those mentioned above may also cause variations to picture sharpness.

Two somewhat related forms of compensation for variations in picture sharpness are known in the prior art. One form is generally called video peaking which is a form of high frequency emphasis. Typical prior art video peaking circuits boost the high frequency components of the video signal. Sich circuits also typically have an undesired phase delay associated therewith.

The term "aperture correction" is primarily used with cameras to refer to compensation for spot size. The term is also used in receivers to refer to a particular form of video peaking which does not have a phase delay associated therewith. Aperture correction involves the addition of pre-shoot and over-shoot components to transitions or transients in the video signal. Thus, the sharpness of the displayed image is enhanced by sharpening the transition from one brightness level to another brightness level.

A typical prior art aperture correction circuit includes a differential stage with a delay line connected between the two inputs. The video signal is applied to the first input with a delayed video signal applied to the second input. These two signals cause the differential stage to provide a pre-shoot signal. The receiving end of the delay line is unterminated so that a reflected and twice delayed video signal is also applied to the first input. The delayed and twice delayed video signals cause the differential stage to provide an over-shoot signal. The pre-shoot and over-shoot signals are added to the delayed video signal to provide an aperture corrected video signal.

While numerous forms of aperture correction and peaking circuitry are known in the prior art, such circuitry typically suffers from one or more disadvantages. Discrete aperture correction circuitry is typically simple to avoid expense but has less than optimum performance. Other known forms of aperture correction circuitry are unduly complex. In addition, known prior art aperture correction circuitry tends to emphasize noise thereby deleteriously affecting the weak signal performance of the television receiver. Accordingly, the expense, complexity, and deleterious performance of known prior art aperture correction circuitry has limited the utility of such circuitry. Furthermore, known prior art aperture correction circuits are not generally controlled by a direct current or voltage so that the aperture correction signal is not readily automatically controlled. Adjustment of prior art aperture correction circuits generally involves AC control which is not easily controlled automatically.

OBJECTS OF THE INVENTION

Accordingly, it is a primary object of this invention to obviate the above noted and other disadvantages of the prior art.

It is a further object of this invention to provide a new and novel video processing system for television receivers.

It is a still further object of this invention to provide a video processing system with the capability of optimum correction of video signal errors.

It is a yet further object of this invention to provide a video processing system which incorporates novel aperture correction circuitry.

It is a further object of this invention to provide aperture correction circuitry for a video processing system which is readily controlled by a direct voltage or current.

It is a still further object of this invention to provide aperture correction circuitry with optimum performance.

It is a yet further object of this invention to provide aperture correction circuitry for a video processing system which is readily automatically controlled.

It is a yet further object of this invention to provide aperture correction circuitry for a video processing system suitable for fabrication in integrated circuit form.

SUMMARY OF THE INVENTION

The above and other objects and advantages are achieved in one aspect of this invention by aperture correction circuitry for a video processing system which includes a differential stage including first and second transistors with delay means connected between the bases of the first and second transistors. A means is connected to the base of one of the first and second transistors for providing a video signal thereto.

In one aspect the aperture correction circuitry includes a manually variable impedance, a current source, and output means. The current source is connected to the emitters of the first and second transistors and to the impedance for providing a direct current to the emitters proportional to the setting of the variable impedance for controlling the gain of the differential stage. The output means is connected to the collector of the first transistor for providing an aperture correction signal with pre-shoot and over-shoot portions proportional to the time delay of the delay means.

In another aspect the aperture correction circuitry includes a current mirror including a controlled transistor connected to the collector of the first transistor and a reference diode connected to the controlled transistor and to the collector of the second transistor. The collector current of the second transistor is the reference current mirrored by the controlled transistor to provide an aperture correction signal at the collector of the first transistor with pre-shoot and over-shoot portions proportional to the time delay of the delay means.

BRIEF DESCRIPTION OF THE DRAWINGS

FIG. 3 is a schematic diagram of a further portion of the block diagram of FIG. 1 including the aperture correction circuitry in accordance with the preferred embodiment of the invention.

DETAILED DESCRIPTION OF THE PREFERRED EMBODIMENT

For a better understanding of the present invention, together with other and further objects, advantages and capabilities thereof, reference is made to the following disclosure in conjunction with the accompanying drawings.

Figure 1:
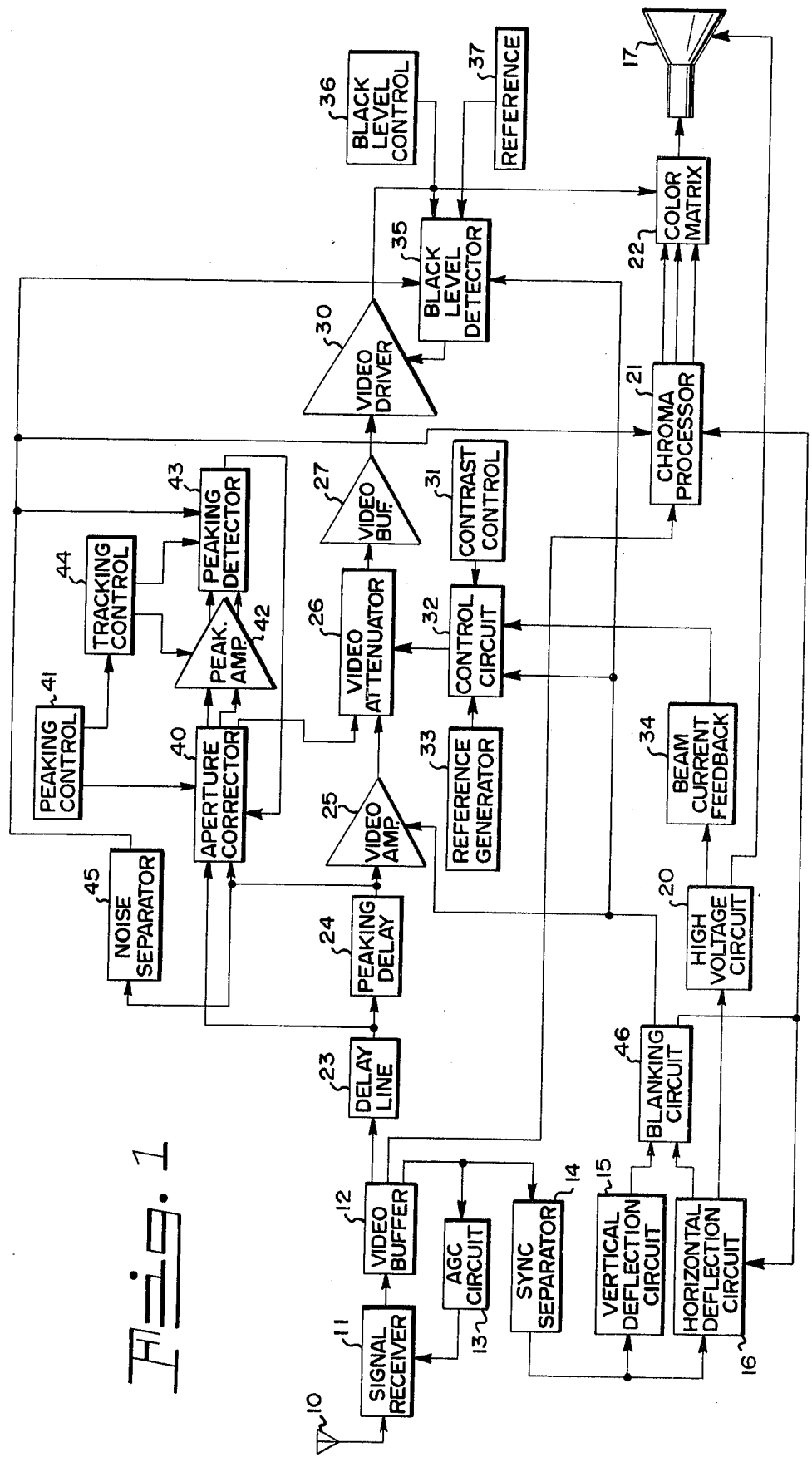
FIG. 1 is a block diagram of a television receiver including a video processing system incorporating a preferred embodiment of the invention.

FIG. 1 is a block diagram of a television receiver incorporating a video processing system incorporating aperture correction circuitry in accordance with the invention. A signal receiving means illustrated as antenna 10 is connected to an input of a signal receiver 11. Signal receiver 11 receives a radio frequency (RF) carrier modulated by a composite video signal from antenna 10 and processes the received signal to provide a composite video signal to a video buffer 12. Video buffer 12 provides at least the synchronizing pulse portion of the composite video signal to an automatic gain control (AGC) circuit 13 and to a synchronizing pulse separator 14. AGC circuit 13 provides a gain control signal receiver 11. Sync separator 14 provides separated synchronizing pulses to a vertical deflection circuit 15 and a horizontal deflection circuit 16. Deflection circuits 15 and 16 include deflection windings associated with an image display device illustrated as a cathode ray tube (CRT) 17 for deflecting the electron beam or beams therein. Horizontal deflection circuit 16 provides an output signal to a high voltage circuit 20 which develops the usual high operating voltages for CRT 17. Video buffer 12 provides at least the chrominance portion of the composite video signal to a chroma processor 21 which processes the chrominance portion of the composite video signal to provide three color difference signals to a color matrix circuit 22. Color matrix 22 combines the color difference signals with the luminance or video signal to provide color signals to CRT 17.

Video buffer 12 further provides the composite video signal to a video amplifier including a plurality of stages. The output of video buffer 12 is connected to a delay line 23 which provides a usual delay equalization between the luminance and chrominance signals. The output of delay line 23 is coupled via a peaking or aperture correction delay 24 to an input of a video amplifier stage 25. Video amplifier 25 comprises a means for providing a video signal to a video signal input of a gain controlled stage illustrated as a video attenuator 26. An output of video attenuator 26 is connected via a video amplifier stage or buffer 27 to an output stage or video driver 30 of the video amplifier. Video driver 30 provides the output luminance portion of the composite video signal to color matrix 22.

Video attenuator 26 has a gain control input which is coupled to a gain control means for providing a gain control signal thereto. The gain control signal causes video attenuator 26 to alter the amplitude of signals to the video signal input by an amount determined by the gain control signal. The gain control means includes a means for providing a DC control signal illustrated as a connection between a gain control input of control circuit 32 and contrast control 31. A control circuit 32 compares the DC control signal from contrast control 31 to a reference provided by a reference generator 33. Control circuit 32 is connected to the gain control input of video attenuator 26. The gain control means also includes a beam current feedback means 34. An output of high voltage circuit 20 is connected to beam current feedback means 34 which has an output connected to an input of control circuit 32. Beam current feedback means 34 detects the level of beam current drawn by CRT 17 from high voltage circuit 20. Beam current feedback means 34 and control circuit 32, accordingly, include automatic control means for automatically altering the gain of video attenuator 26 in response to the beam current of CRT 17.

A black level control means is connected to output stage 30 for detecting the black level of the video signal provided by output stage 30 and for providing a control signal to output stage 30 in response to the detected black level. The output of video driver 30 is connected to an input of a comparing means illustrated as a black level detector 35 which has an output connected to a control input of video driver 30. An adjustable control illustrated as a black level control 36 is also connected to the input of black level detector 35. Black level detector 35 compares the black level of the video signal from video driver 32 to a reference level provided by a source of reference potential 37. Black level control 36 permits viewer adjustment of the black level of the displayed image on CRT 17. Once the viewer selects the desired black level, the black level control means automatically controls the black level of the luminance signal.

The video processing system of FIG. 1 further includes aperture correction means for providing an aperture correction signal to the video signal input of video attenuator 26. The aperture correction means includes an aperture correction stage 40 which receives inputs from the output of delay line 23 and the output of peaking delay 24. Aperture corrector 40 generates an aperture correction signal including pre-shoot and over-shoot signals which are coupled to the video signal input of video attenuator 26. Accordingly, video attenuator 26 provides an aperture corrected video signal or combined video signal and aperture correction signal to video buffer 27 and video driver 30. The amplitude of the pre-shoot and over-shoot signals is controlled by a variable bias means illustrated as a peaking control 41 which has an output connected to a control input of aperture corrector 40.

A pair of differential outputs from aperture corrector 40 are coupled to automatic control means such as the inputs of a peaking amplifier 42. Peaking amplifier 42 provides differential outputs to a peaking detector 43 which provides an automatic control signal to aperture corrector 40. An output of peaking control 41 is connected to a tracking control 44 which provides outputs to peaking amplifier 42 and peaking detector 43. Tracking control 44 causes the automatic control means to track the viewer preference setting of peaking control 41.

The output of peaking delay 24 is also connected to an input of a noise separator 45 which provides noise suppression signals to peaking detector 43, black level detector 35, and chroma processor 21. Noise separator 45, for example, detects noise pulses which have amplitudes that exceed the synchronizing pulse amplitude to disable desired portions of the video processing system and chroma processor. The noise suppression signals inhibit the automatic control circuits from setting-up on noise pulses.

Outputs from vertical deflection circuit 15 and horizontal deflection circuit 16 are coupled to inputs of a blanking circuit 46 which provides blanking pulses to video amplifier 25, control circuit 32, and black level detector 35. The vertical and horizontal blanking pulses from blanking circuit 46 cause the video amplifier to blank CRT 17 during retrace or blanking intervals. Another output of blanking circuit 46 can be connected to an input of horizontal deflection circuit 16 to provide automatic frequency and phase control of the horizontal oscillator in circuit 16. Similarly, pulses from blanking circuit 46 can be coupled to chroma processor 21 to gate the color burst signal.

At least the luminance portion of the composite video signal is coupled from video buffer 12 by delay line 23 and the video amplifier to color matrix 22. The amplified and controlled video signal is matrixed with the color difference signals in color matrix 22 to provide suitable drive signals for CRT 17. The black level control means controls the black level of the displayed image in accordance with the viewer preference setting of black level control 36. If the black level of the received signal undesirably varies, the black level control means provides a control signal to video driver 30 to automatically adjust the black level.

Automatic contrast control is provided by varying the gain of video attenuator 26 in accordance with the viewer preference setting of contrast control 31 and the level of beam current drawn by CRT 17. The aperture correction or peaking signal provided by aperture corrector 40 is coupled to the video signal input of video attenuator 26 so that the aperture correction signal is amplified or attenuated by the same gain as the video signal. The amount of aperture correction is controlled by the viewer preference setting of peaking control 41 with the automatic control loop controlling the amount of peaking to track the setting of peaking control 41. The automatic control loop thus causes aperture corrector 40 to peak or depeak the video signal in response to deficient or excessive pre-shoot and over-shoot. The automatic loop also causes aperture corrector 40 to depeak the video signal when the video signal contains excessive noise. The preferred implementation of the video processing system is in integrated circuit form with certain discrete components or circuits connected thereto.

Figure 2:
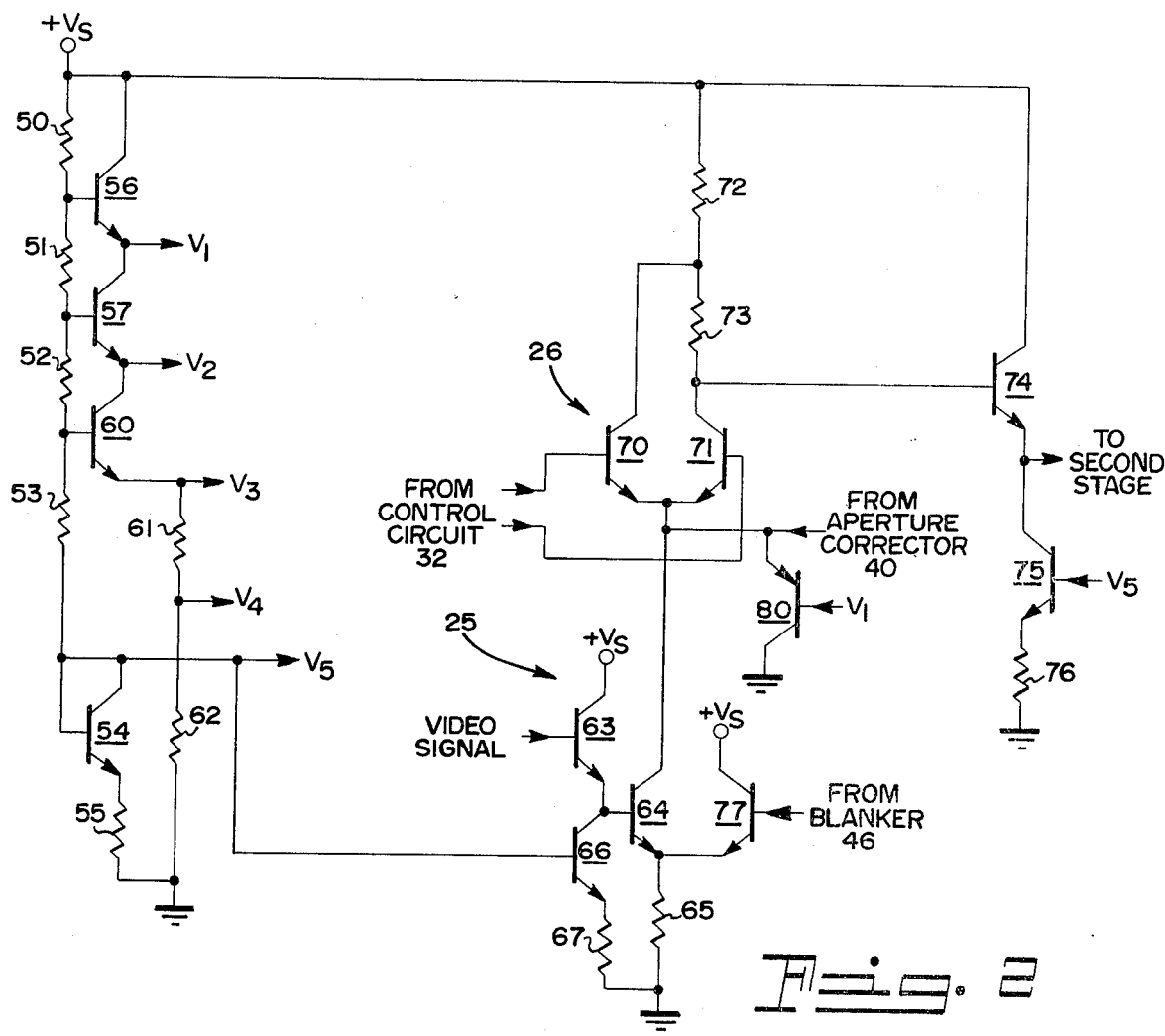
FIG. 2 is a schematic diagram of a portion of the block diagram of FIG. 1 including a portion of the video amplifier.

FIG. 2 is a schematic illustration of video amplifier 25 and video attenuator 26. In accordance with typical integrated circuit practice, a bias chain is utilized to provide various energizing, bias, and reference voltages. An external source of energizing voltage illustrated as a terminal $+V_S$ is connected by a chain of resistors 50, 51, 52, and 53 to a base and collector of a transistor 54. Transistor 54 further has an emitter connected by a resistor 55 to a common conductor illustrated as circuit ground. The junction between resistors 50 and 51 is connected to a base of a transistor 56 which has a collector connected to source $V_S$ and an emitter connected to a bias line $V_1$. The junction between resistors 51 and 52 is connected to a base of a transistor 57 which has a collector to bias line $V_1$ and an emitter connected to a bias line $V_2$. The junction between resistors 52 and 53 is connected to a base of a transistor 60 which has a collector connected to bias line $V_2$ and an emitter connected to a bias line $V_3$. Bias line $V_3$ is connected by a resistor 61 in series with the resistor 62 to circuit ground. The junction between resistor 61 and 62 is connected to a bias line $V_4$. The base and collector of transistor 54 are connected to a bias line $V_5$. Accordingly, a variety of voltage levels are provided by the bias chain with the magnitude of the voltages depending upon the ratios of the various resistors. Emitter-follower transistors 56, 57, and 60 tend to diminish loading effects on the bias chain.

Transistor 54 is connected to provide a diode in integrated circuit form. All similarly connected transistors also function as diodes and may be called diodes herein.

Video amplifier 25 includes a transistor 63 which has a base connected to the output of peaking delay 24 of FIG. 1. A collector of transistor 63 is connected to source $V_S$ and an emitter is connected to a base of a transistor 64. An emitter of transistor 64 is connected by a resistor 65 to circuit ground. The emitter of transistor 63 is further connected to a collector of a transistor 66 which has an emitter connected by a resistor 67 to circuit ground. A base of transistor 66 is connected to the $V_5$ bias line.

The collector of transistor 64 is connected to the video signal input illustrated as the emitters of a pair of transistors 70 and 71 of video attenuator 26. A collector of transistor 70 is connected by a resistor 72 to source $V_S$, while a collector of transistor 71 is connected by a resistor 73 to the collector of transistor 70. Accordingly, transistors 70 and 71 have different load resistances, that is, resistors 72 and 73 comprise the collector load resistance of transistor 71 while resistor 72 comprises the collector load resistance of transistor 70.

The collector of transistor 71, which comprises the output of video attenuator 26, is connected to a base of a transistor 74, which comprises the input stage of video buffer 27. A collector of transistor 74 is connected to source $V_S$ and an emitter is connected to a second stage of video buffer 27. The $V_5$ bias line is connected to a base of a transistor 75 which has a collector connected to the emitter of transistor 74 and an emitter connected by a resistor 76 to circuit ground.

The video signal with negative-going black level is applied to the base of emitter-follower transistor 63. Transistor 66 is a current source for transistor 63. Transistor 63 shifts the level of the input video signal down by approximately 0.7 volts corresponding to the base-emitter volt drop of transistor 63. Transistor 64 comprises a video signal current source for video attenuator transistors 70 and 71. The collector current of transistor 71 flows through both of resistors 72 and 73 while the collector current of transistor 70 flows through resistor 72. Accordingly, when transistor 71 is conducting and transistor 70 is off, the gain of the video amplifier and attenuator is $G = (R72 + R73)/R65$. Similarly, when transistor 70 is conducting and transistor 71 is off, the gain is $G = R72/R65$. When both of transistors 70 and 71 are conducting, the gain is between the limits defined by the off states of transistors 70 and 71. Thus, by controlling the relative conduction of transistors 70 and 71, the gain of video attenuator 26 is controlled.

In one practical embodiment of the invention resistor 72 was 500 ohms, resistor 73 was 4,500 ohms, and resistor 65 was 1,000 ohms providing a range of gain control from 0.5 to 5.0. When both of transistors 70 and 71 are conducting, the gain is between those limits. The video signal with positive going black level at the collector of transistor 71 is coupled via transistor 74 to the second stage of video buffer 27.

A transistor 77 has an emitter connected to the emitter of transistor 64 and a collector connected source $V_S$. A base of transistor 77 receives a blanking signal from blanking circuit 46 to turn transistor 64 off during retrace or blanking intervals. A transistor 80 has a collector connected to circuit ground, an emitter connected to the emitters of transistors 70 and 71, and a base connected to the $V_1$ bias line. Transistor 80 is a clamp which limits the positive voltage at the emitters of transistors 70 and 71 to a desired maximum level.

Control circuit 32 has a pair of outputs connected to bases of transistors 70 and 71 which correspond to the gain control input of video attenuator 26. Control signals or voltages applied to the bases of transistors 70 and 71 control the relative conduction of transistors 70 and 71 thereby controlling the gain of video attenuator 26 and the amplitude or contrast of the video signal.

FIG. 3 is a schematic diagram of the aperture correction means including a preferred embodiment of the invention. FIG. 3 corresponds to the circuitry of video buffer 12, delay line 22, peaking delay 24, and blocks 40–44 of FIG. 1. The output from signal receiver 11 is a composite video signal provided by a video detector. The composite video signal from the video detector is coupled to a base of a transistor 210. Transistor 210 has a collector connected by a resistor 211 to source $V_S$ and an emitter connected to sync separator 14 and via a filter 212 to chroma processor 21. The collector of transistor 210 is connected by a 3.58 MHz trap 213 to delay line 23.

The output of delay line 23 is coupled via a parallel connected inductor 214 and resistor 215 to a base of an inverter transistor 216. The base of transistor 216 is further connected by a resistor 217 to source $V_S$. An emitter of transistor 216 is connected by a resistor 218 to source $V_S$ and by a capacitor 219 in series with the resistor 220 to source $V_S$. A collector of transistor 216 is connected by a resistor 221 to circuit ground.

Aperture corrector 40 includes a pair of transistors 222 and 223 connected as a differential stage. The collector of transistor 216 is connected to a base of transistor 223 and by an inductor 224 in parallel with a resistor 225 to a base of transistor 222 and to the inputs of video amplifier 25 and noise separator 45. The base of transistor 222 is connected by a capacitor 226 to circuit ground.

Peaking control 41 includes a manually variable or adjustable bias or impedance means illustrated as a potentiometer 227. One end of the resistance element of potentiometer 227 is connected to source $V_S$ while the other end is connected by a resistor 230 to circuit ground. The tap of potentiometer 227 is connected by a resistor 231 to a base of a transistor 232. The base of transistor 232 is further connected to circuit ground by a pair of capacitors 233. A collector of transistor 232 is connected to source $V_S$ while an emitter thereof is connected to a base of a transistor 234 and a base of a transistor 235. A collector of transistor 234 is connected to the base of transistor 232 and an emitter is connected by a resistor 236 to circuit ground. Transistor 235 has a large emitter area, illustrated as four emitters, connected by a resistor 237 to circuit ground. A collector of transistor 235 is connected to emitters of transistors 222 and 223.

Aperture corrector 40 further includes an output means illustrated as a pair of transistors 240 and 241 connected as a current source or current mirror. Transistor 241 forms a reference diode for the current mirror and has a collector connected to a base thereof and to a base of transistor 240. Transistor 240 is the controlled transistor which has a collector current that mirrors the reference current through transistor 241. Transistors 240 and 241 are illustrated as having three emitters connected by resistors 242 and 243, respectively, to source $V_S$. A collector of transistor 240 is connected to a base and a collector of a transistor 244. The base of transistor 244 is connected to a base of a transistor 245 which has a collector connected by a resistor 246 to the collector of transistor 241. The bases of transistors 244 and 245 are connected to the video signal input of video attenuator 26. Transistor 244 has an emitter connected by a resistor 247 to an emitter of transistor 245. The emitter of transistor 244 is further connected by a resistor 250 to a collector of transistor 222. The emitter of transistor 245 is further connected by a resistor 251 to a collector of transistor 223.

Peaking amplifier 42 has a pair of transistors 252 and 253. The collector of transistor 223 is connected to a base of transistor 252, while the collector of transistor 222 is connected to a base of transistor 253. A collector of transistor 252 is connected by a resistor 254 to the V₁ bias line. A collector of transistor 253 is connected by a resistor 255 to the V₁ bias line.

Peaking detector 43 includes a pair of transistors 256 and 257. The collector of transistors 253 is connected to a base of transistor 256, while the collector of transistor 252 is connected to a base of transistor 257. A collector of transistor 257 is connected to source $V_S$. A collector of transistor 256 is connected to an emitter of a transistor 260 which has a base connected to an emitter of a transistor 261. Transistor 261 also has a collector connected to a base thereof and by a resistor 262 to source $V_S$. A collector of transistor 260 is connected to the base of transistor 261. The collector of transistor 256 is further connected to a base of a transistor 263 which has a collector connected to circuit ground and an emitter connected by a resistor 264 to source $V_S$. The emitter of transistor 263 is further connected to a base of transistor 265 which has an emitter connected by a resistor 266 to source $V_S$.

A collector of transistor 265 is connected to a base and a collector of a transistor 267 and to a base of a transistor 270. Transistor 267 has an emitter connected by a resistor 271 to circuit ground. Transistor 270 has an emitter connected by a resistor 272 to circuit ground and a collector connected to the base of transistor 232. An output from noise separator 45 is connected to a base of a transistor 273 which has an emitter connected to circuit ground and a collector connected to the base of transistor 267. The base of transistor 273 is connected by a resistor 274 to circuit ground. The collector of transistor 273 is connected by a resistor 275 to circuit ground.

Tracking control 44 includes a resistor 276 connected between the tap of potentiometer 227 and a base of a transistor 277. Transistor 277 has a collector connected to source $V_S$ and an emitter connected to bases of transistors 280, 281, and 282. Transistor 280 has a collector connected to the base of transistor 277 and an emitter connected by a resistor 283 to circuit ground. Transistor 281 has a collector connected to emitters of transistors 256 and 257 and an emitter connected by a resistor 284 to circuit ground. Transistor 282 has an emitter connected by a resistor 285 to circuit ground and a collector connected by a resistor 286 to an emitter of transistor 252 and by a resistor 287 to an emitter of transistor 253. A transistor 290 has a base connected to the V₅ bias line, an emitter connected by a resistor 291 to circuit ground, and a collector connected to the emitters of transistors 256 and 257.

In operation, the video signal is coupled via video buffer 210, delay line 23, and inverter 216 to the base of transistor 223. The video signal also is coupled through the delay means or peaking delay comprising inductor 224 and capacitor 226 to the base of transistor 222. The video signal at the base of transistor 222 is delayed slightly from the video signal at the base of transistor 223. Peaking delay 24 is unterminated, that is, it has a high impedance at the base of transistor 222 so that the video signal is reflected back through peaking delay 24 to the base of transistor 223. Thus, the video signal appears undelayed and twice delayed at the base of transistor 223. Resistor 221 has a proper value to terminate peaking delay 24 at the base of transistor 223 so that additional reflections do not occur. Resistor 225 provides damping for peaking delay 24. In some prior art aperture correction circuits the peaking delay is obtained by tapping delay line 23 which could also be used herein.

Potentiometer 227 in peaking control 41 is the viewer preference control for controlling the amount of pre-shoot and over-shoot added to the video signal. Adjustment of potentiometer 227 provides a particular control current via resistor 231 to the base of transistor 232. This current is a variable direct current which is multiplied by transistors 232, 234, and 235 by a relatively constant multiplication factor. The current through resistor 231 also charges capacitors 233. Transistors 232, 234, and 235 comprise a current source, current mirror, or current multiplier for providing emitter current to transistors 222 and 223. This emitter current is a direct current proportional to the setting of potentiometer 227 to control the gain of the differential stage.

When the video signal is at a constant level, the signals at the bases of transistors 222 and 223 are equal so that one-half of the current through transistor 235 flows through each of transistors 222 and 223. The collector current of transistor 222 flows through transistor 240 and transistor 244, while the collector current of transistor 223 flows through transistors 241 and 245. Transistor 241 is a reference diode for the current mirror including transistor 240, while transistor 244 is a reference diode for a current mirror including transistor 245.

When the video signal is at a constant level, it is desired that no output current flows to or from video attenuator 26. The current mirror including transistors 240 and 241 assures that no current flows to or from video attenuator 26 when equal currents flow through transistors 222 and 223. To explain further, the current through transistor 223 flows through transistor 241. Since transistor 241 is the reference diode for the current mirror, the current through transistor 240, and hence, the current flowing through transistor 222, must be equal thereto. Thus, no current flows to or from video attenuator 26.

Figure 4:
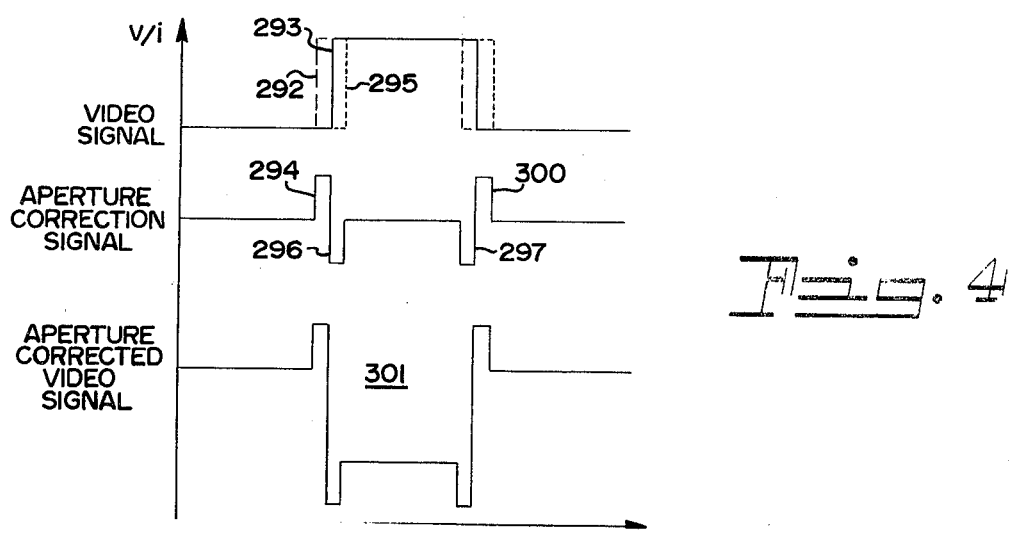
FIG. 4 is a waveform diagram to aid in explaining the operation of the aperture correction circuitry of FIG. 3.

Referring next to FIG. 4, a video signal with a white-going pulse is shown. The undelayed video signal applied to the base of transistor 223 is illustrated by dashed line 292. The once delayed video signal is illustrated by solid line 293. This is the video signal pulse applied to video attenuator 26 via video amplifier 25 and to the base of transistor 222. Transistor 223 receives pulse 292 before transistor 222 receives pulse 293 so that transistor 223 conducts more current than transistor 222. If the transition is sufficiently sharp and of sufficient amplitude, transistor 223 will conduct all of the collector current of transistor 235 while transistor 222 will turn off. Now transistor 241 will force transistor 240 to carry a larger collector current than transistor 222 carries. Thus, some or all of the collector current of transistor 240 will flow to the video signal input of video attenuator 26. This current will cause a black-going voltage to be developed at the base of transistor 74 across resistors 72 and 73 (FIG. 2). This pulse, illustrated as pulse 294 in FIG. 4 is called a black-going pre-shoot which is proportional to the time delay of peaking delay 24.

The twice delayed leading edge transition of the video signal pulse is illustrated by dotted line 295 in FIG. 4. Transistors 222 and 223 also compare the delayed and twice delayed pulses. Since the delayed pulse reaches the base of transistor 222 before the twice delayed pulse reaches the base of transistor 223, transistor 222 conducts more current than transistor 223. If the difference in the pulses is sufficiently great, transistor 223 will turn off. Now transistor 241 will force transistor 240 to conduct less current than transistor 222 conducts so that current will flow out of the video signal input of video attenuator 26. Accordingly, a white-going over-shoot pulse 296 is generated at the base of transistor 74 which is proportional to the time delay of peaking delay 24. In a similar manner pre-shoot pulse 297 and over-shoot pulse 300 are generated on the trailing edge of the video signal pulse. The aperture corrected video signal developed at the base of transistor 74 is illustrated by waveform 301 of FIG. 4 wherein the video signal has a positive-going black level.

The amplitude of the aperture correction signal is controlled by varying potentiometer 227 of peaking control 41. The gain of aperture corrector 40 is determined by the amount of current flowing through transistor 235, which is in turn determined by the setting of potentiometer 227.

The current mirror including transistors 244 and 245 permit a differential signal for peaking amplifier 42 to be developed across resistors 250 and 251 without affecting the DC balance of aperture corrector 40. Resistor 247 couples current between the emitters of transistors 244 and 245 to prevent them from completely cutting off on high level signals.

The video processing system also includes automatic aperture correction circuitry which automatically maintains the aperture correction at a preset level and automatically depeaks weak or noisy video signals. The automatic peaking or aperture correction control adjusts the aperture corrector gain until the peaks of the white-going over-shoot and pre-shoot pulses track the peaking control setting or threshold. The automatic peaking control features a tracking control which causes the current through peaking amplifier 42 to track with the current through peaking detector 43. These currents also track the current through aperture corrector 40.

As was indicated previously, the sharpness of the displayed image on CRT 17 can vary for many reasons. Many of the causes of these variations differ from one channel to another and from one signal source to another. They may also vary over time thereby necessitating frequent readjustment of potentiometer 227 by the viewer to maintain the desired level of aperture correction. To circumvent this necessity for frequent readjustment of potentiometer 227, the automatic control means including peaking amplifier 42 and peaking detector 43 detects aperture correction signals that exceed a threshold determined by the setting of potentiometer 227. If no such signals are detected, the gain of aperture corrector 40 is increased to increase the amplitude of the aperture correction signal until the desired amount of aperture correction is provided. Similarly, if the aperture correction signals greater than the threshold become excessive, the gain of aperture corrector 40 is decreased. Accordingly, the automatic control means automatically controls the amplitude of the aperture correction signal in response to a bias provided by a variable bias means and in response to the amplitude of the aperture correction signal.

Transistors 277, 280, 281, and 282 provide a current mirror or current multiplier for the currents flowing through peaking amplifier 42 and peaking detector 43. The input current is derived from potentiometer 227 so that a variable reference current is coupled through the buffered reference transistors 277 and 280. Transistor 290 provides a fixed additional emitter current for transistors 256 and 257.

In the quiescent or non-peaking state, the collector voltages of transistors 222 and 223 are equal. Accordingly, the base voltages of transistors 252 and 253 are equal and one-half of the collector current of transistor 282 flows through each of transistors 252 and 253. Resistors 254 and 255 are of unequal values with resistor 255 being larger so that an offset differential voltage is developed at the bases of transistors 256 and 257. Since resistor 255 is larger, the volt drop thereacross will be greater than the volt drop across resistor 254. Accordingly, in the quiescent state transistor 257 will be conducting and transistor 256 will be off. When transistor 256 is off, transistors 263, 265, 267 and 270 will also be off. This state is defined as the peaking detector off state.

When aperture corrector 40 generates black-going pre-shoots and over-shoots, transistor 223 conducts more than transistor 222. Accordingly, transistor 252 tends to be biased off while transistor 253 tends to be biased on thereby further biasing peaking detector 43 off. Thus, peaking detector 43 does not respond to black-going pre-shoots and over-shoots generated by aperture corrector 40.

When aperture corrector 40 generates white-going pre-shoots and over-shoots, however, transistor 222 conducts more than transistor 223. Accordingly, the differential signal coupled to the bases of transistors 252 and 253 causes transistor 252 to conduct more and transistor 253 to conduct less. If the differential change in conduction is sufficient to overcome the offset voltage due to the different values of resistors 254 and 255, transistor 256 will be turned on. This offset voltage defines the previously mentioned threshold for the detection of aperture correction signals.

Conduction by transistor 256 causes transistors 263 and 265 to conduct. Conduction by transistor 265, in turn, causes transistor 270 to conduct to discharge capacitors 233. When capacitors 233 are discharged conduction by transistor 235 decreases to decrease the gain of aperture corrector 40.

Thus, the gain of aperture corrector 40 is controlled by an automatic control loop which is dependent primarily upon the amplitude of the white-going pre-shoots and over-shoots of the aperture correction signal. If the white-going pre-shoots and over-shoots decrease in amplitude, the gain of aperture corrector 40 is automatically increased to increase the amount of aperture correction. Similarly, if the amplitude of the white-going pre-shoots and over-shoots increases, capacitors 233 are discharged to decrease the gain of aperture corrector 40. This feature is particularly advantageous to prevent over-peaking on weak and noisy signals. It should be noted that while only white-going pre-shoots and over-shoots are used by the automatic control loop, black-going pre-shoots and over-shoots could be used as well.

Transistor 273 is turned on by output pulses from noise separator 45 to prevent transistor 270 from discharging capacitors 233 on high level noise. Noise separator 45, however, does not operate on low level noise. Aperture corrector 40 will attempt to provide an aperture correction signal in response to noise transients. If the noise becomes sufficiently concentrated, peaking detector 43 will detect the concentrated peaks of the aperture correction signal due to noise and will cause transistor 270 to discharge capacitors 233 sufficiently to reduce the gain of aperture corrector 40 to minimum. This depeaking action occurs automatically so that the viewer is not required to adjust potentiometer 227 to decrease the peaking of weak and noisy signals.

In one practical embodiment of the invention the following relationships were utilized to obtain proper tracking of aperture corrector 40, peaking amplifier 42, and peaking detector 43. Resistors 231 and 276 were large resistors of identical value. The values of resistors 231 and 276 together with potentiometer 227 and resistor 230 were selected such that over the range of potentiometer 227, the current through resistors 231 and 276 varied over the range 0–200 microamperes. Transistors 232, 234, and 235 multiplied the current through resistor 231 (assuming capacitors 233 were charged) by twenty so that the collector current of transistor 235 varied over the range 0–4 milliamperes. Thus, the gain of aperture corrector 40 could be varied over relatively broad limits. Transistors 277, 280, and 282 multiplied the current through resistor 276 by five so that the collector current of transistor 282 varied over a range of 0–1 milliampere. Similarly, transistors 277, 280, and 281 multiplied the current through resistor 276 by unity so that the collector current of transistor 281 varied over the range 0–200 microamperes. Transistor 290 provided a constant current of 200 microamperes. Thus, the current at the emitters of transistors 256 and 257 varied over the range 200–400 microamperes. All of these currents varied simultaneously and accurately tracked over the range of potentiometer 227.

The threshold of peaking detector 43 established by the offset voltage across resistors 254 and 255 also varies with the setting of potentiometer 227. The offset voltage or voltage difference at the bases of transistors 256 and 257 under quiescent conditions is given by the expression $V_D = (R255 - R254) I_C/2$ where $I_C$ is the collector current of transistor 282. This collector current is divided by two because the current equally divides between transistors 252 and 253 under quiescent conditions. Thus, it is readily seen that the offset voltage is directly proportional to the collector current of transistor 282 and varies with the setting of potentiometer 227. This relationship means that peaking detector 43 detects lower amplitude aperture correction signals when the gain of aperture corrector 40 is reduced by altering potentiometer 227. If the offset voltage did not track the setting of potentiometer 227, the loop gain of the automatic control loop would vary depending upon the setting of potentiometer 227.

In the above-mentioned practical embodiment, the collector current of transistor 256 varied over the range 0–400 microamperes depending upon both the setting of potentiometer 227 and the conduction level of transistor 256 due to detected white-going aperture correction signals. Transistors 260, 261, 263, and 265 multiplied the collector current of transistor 256, while the collector current of transistor 265 was further multiplied by transistor 267 and 270. Transistor 270 saturated with an emitter current of 14–18 milliamperes depending upon the setting of peaking control 227. This current when compared to the 0–200 microampere current through varistor 231 provides a discharge to charge current ratio for capacitors 233 that provides a peak detection function.

In this practical embodiment the automatic control loop, when referenced with a properly modulated Indian Heat Test Pattern signal, provided a "closed loop" gain of one-half off the "open loop" gain. This gain reduction means that the automatic control loop had a 2-to-1 (6dB) reserve capability to increase the peaking when necessary no matter where the peaking control was set. Furthermore, the automatic control loop could not increase the peaking more than 6dB.

Accordingly, novel aperture correction circuitry has been shown and described. Aperture correction circuitry in accordance with the invention is readily controllable by a direct voltage or current. Thus, lead dress is not critical as it is with AC control. The DC signal controls the gain of the aperture correction circuitry to control the amplitude of the aperture correction signal in a predictable manner. The DC control also readily permits automatic feedback control to be utilized to automatically control the amount of pre-shoot and over-shoot in the aperture correction signal and to accurately track the peaking control setting. The output means converts the double ended differential signal to a single ended signal. This conversion effectively doubles the gain of the aperture corrector. The output current mirror also balances the currents through the differential aperture corrector stage which permits the peaking control to be varied without altering the quiescent current flowing through the load.

While there has been shown and described what is at present considered the preferred embodiment of the invention it will be obvious to those skilled in the art that various changes and modifications may be made therein without departing from the invention as defined by the appended claims.

What is claimed is:

1. Aperture correction circuitry for a video processing system comprising:
   a differential stage including first and second transistors;
   a manually variable impedance;
   a current source connected to the emitters of said first and second transistors and to said impedance for providing a direct current to the emitters proportional to the setting of said variable impedance for controlling the gain of said diferential stage;
   means connected to the base of one of said first and second transistors for providing a video signal thereto;
   delay means connected between the bases of said first and second transistors; and
   output means connected to the collector of said first transistor for providing an aperture correction signal with pre-shoot and over-shoot portions proportional to the time delay of said delay means.

2. Aperture correction circuitry as defined in claim 1 wherein said manually variable impedance provides a variable direct current to said current source and said current source multiplies said variable direct current by a relatively constant multiplication factor.

3. Aperture correction circuitry as defined in claim 2 wherein said manually variable impedance includes a potentiometer.

4. Aperture correction circuitry as defined in claim 1 wherein said output means includes a current mirror having a controlled transistor connected to the collector of said first transistor and a reference diode connected to said controlled transistor and to the collector of said second transistor where the collector current of said second transistor is the reference current mirrored by said controlled transistor.

5. Aperture correction circuitry as defined in claim 4 wherein said video processing system includes a gain controlled stage having a video signal input connected to said means for providing a video signal and to the collector of said first transistor and a gain control input connected to a contrast control.

6. Aperture correction circuitry for a video processing system comprising:
- a differential stage including first and second transistors;
- means connected to the base of one of said first and second transistors for providing a video signal thereto;
- delay means connected between the bases of said first and second transistors; and
- a current mirror including a controlled transistor connected to the collector of said first transistor and a reference diode connected to said controlled transistor and to the collector of said second transistor where the collector current of said second transistor is the reference current mirrored by said controlled transistor to provide an aperture correction signal at the collector of said first transistor with pre-shoot and over-shoot portions proportional to the time delay of said delay means.

7. Aperture correction circuitry as defined in claim 6 wherein said video processing system includes a gain controlled stage having a video signal input connected to said means for providing a video signal and to the collector of said first transistor and a gain control input connected to a contrast control.

8. Aperture correction circuitry as defined in claim 6 including a manually variable impedance and a current source connected to the emitters of said first and second transistors and to said impedance for providing a direct current to the emitters proportional to the setting of said variable impedance for controlling the gain of said differential stage.

9. Aperture correction circuitry as defined in claim 8 wherein said manually variable impedance provides a variable direct current to said current source and said current source multiplies said variable direct current by a relatively constant multiplication factor.

10. Aperture correction circuitry as defined in claim 9 wherein said manually variable impedance includes a potentiometer.

* * * * *